UNITED STATES PATENT OFFICE.

WILLIAM B. WALL AND MOSES S. JONES, OF TUSTIN, AND AMOS D. BISHOP, OF ORANGE, CALIFORNIA.

PROCESS OF FUMIGATING TREES AND OTHER PLANTS.

SPECIFICATION forming part of Letters Patent No. 445,342, dated January 27, 1891.

Application filed December 10, 1889. Serial No. 333,240. (No specimens.)

*To all whom it may concern:*

Be it known that we, WILLIAM B. WALL and MOSES S. JONES, residents of Tustin, in the county of Orange and State of California, and AMOS D. BISHOP, a resident of Orange, in said county and State, all citizens of the United States, have discovered a new and useful Process of Fumigating Trees and other Plants, of which the following is a specification.

Our invention is designed for the destruction of scale-bugs and other insects infesting plants.

It consists in fumigating the plant with hydrocyanic-acid gas in the absence of light.

Hydrocyanic-acid gas has heretofore been employed in fumigating trees; but it has not been considered practicable, for the reason that if the gas were of sufficient strength to destroy the insects on the plant it also injured the foliage and fruit.

We have discovered that when the light is excluded the action of the gas is more effective in destroying insect life and at the same time becomes harmless to plant life unless used excessively.

Our process differs from the ordinary process of fumigating with hydrocyanic-acid gas only in that we exclude the light. This may be done by means of the oiled tent or covering ordinarily used for such fumigation, provided the fumigation is done at night. If the work is done in the day-time, the covering must be so colored as to exclude the actinic rays of light; but we do not believe it possible to produce satisfactory results with any colored tent in bright daylight.

To illustrate our invention we will explain its use in fumigating an orange or lemon tree of twelve feet in height. The tree is first enveloped with an oiled or painted canvas in the ordinary way, such canvas being impervious to the rays of light surrounding the tree. We then place in a vessel under the canvas three ounces of cyanide of potassium, then six ounces of water, and then pour into the vessel three ounces of sulphuric acid and close the covering for a period of about fifteen minutes. The canvas is then removed. The vessel may be covered with a piece of sacking or other textile fabric after the sulphuric acid is poured into it. This will prevent the sprays from the decomposing chemicals from injuring the plant or canvas.

It is obvious the hydrocyanic-acid gas may be produced by other chemicals than those mentioned; also that the time and the amount of gas employed may be varied.

We have secured good results by a fumigation lasting only five minutes.

Now, having described our discovery, what we claim as new, and desire to secure by Letters Patent, is—

The process set forth of fumigating plants with hydrocyanic-acid gas in the absence, substantially, of the actinic rays of light.

WILLIAM B. WALL.
    MOSES S. JONES.
    AMOS D. BISHOP.

Witnesses:
 JAMES R. TOWNSEND,
 GEORGE T. INSLEY,
 HARRY E. HEIGHTON.